United States Patent Office

3,419,526
Patented Dec. 31, 1968

3,419,526
HIGH MOLECULAR WEIGHT THERMOPLASTIC POLYCARBONATES
Hermann Schnell, Krefeld-Urdingen, Ludwig Bottenbruch, Krefeld-Bockum, Gerhard Darsow, Krefeld-Urdingen, and Kurt Weirauch, Krefeld, Germany, assignors to Farbenfabriken Bayer Aktiengesellschaft, Leverkusen, Germany, a corporation of Germany
No Drawing. Filed June 2, 1967, Ser. No. 644,441
Claims priority, application Germany, June 4, 1966, F 49,397
8 Claims. (Cl. 260—49)

ABSTRACT OF THE DISCLOSURE

Polycarbonates having high second order transition temperatures and containing the repeating unit

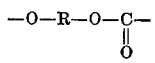

wherein from about 20% to about 100% of the radicals R is a radical having the formula

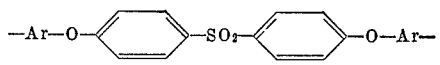

wherein Ar is the same or different, substituted or unsubstituted arylene, arylene ether, diarylene alkane, diarylene and the like radicals, the remainder of the radicals R being the same or different, substituted or unsubstituted alkylene, cycloalkylene or Ar, and a method for preparing them.

---

This invention relates to high molecular weight thermoplastic polycarbonates and more particularly to unique thermoplastic polycarbonates and a method for preparing them.

Thermoplastic polycarbonates having high second order transition temperatures are commercially desirable because of the obvious advantages of such polymers in the plastics industry. However, polycarbonates having extremely high second order transition temperatures have heretofore not been commercially useful because of the disadvantages inherent in polycarbonates having high second order transition temperatures. Thus, for example, polycarbonates prepared from hydroquinone, resorcinol, dihydroxydiphenyl and dihydroxynaphthalene have high second order transition temperatures but they are insoluble in ordinary polycarbonate solvents and/or they decompose rather than melt or, if they do melt, they do so at such high temperatures that they cannot be processed from the melt. The combination of the high melting points and general insolubility of such materials makes it impossible to produce such polycarbonates at a high molecular weight.

With regard to the physical and mechanical properties of polycarbonates, crystallized polycarbonates prepared from nuclear-chlorinated dihydroxydiphenylalkanes and possessing their ultimate tensile strengths do not undergo a rapid deterioration in their tensile strength and elongation properties above their second order transition temperature as do amorphous polycarbonates. At 140° C. these polycarbonates retain almost 80% of their room temperature tensile strength; notwithstanding, however, the second order transition temperature for such polymers is not very high. On the other hand, another type of polycarbonate, that is, those prepared from dihydroxydiphenyl sulfone, are hydrolytically unstable. Even copolymeric polycarbonates prepared from dihydroxydiphenyl sulfone and other bisphenols hydrolyze about fifteen to twenty times more rapidly than polycarbonates prepared from 2,2-bis(4-hydroxyphenyl)propane, for example.

Those polycarbonates prepared from bis(hydroxyaryl) di- and tricycloalkanes, which may be halogen-substituted if desired, (compare, for example, British Patent Specification No. 1,009,019) possess the highest second order transition temperatures which have been achievable heretofore in the prior art, such temperatures reaching almost 300° C. These polymers suffer from inherent disadvantages, however, since they are thermally unstable and become brittle when air tempered, even at temperatures below their second order transition temperature. Further, such polycarbonates discolor and become insoluble in substantially all organic solvents.

It is therefore an object of this invention to provide polycarbonates and a method for making them which is devoid of the foregoing disadvantages.

A further object of this invention is to provide polycarbonates having high second order transition temperatures coupled with good physical and mechanical properties and a high molecular weight.

Another object of this invention is to provide a polycarbonate having a hydrolytic stability that is about 10 to 15 times greater than that of the homopolymeric or copolymeric bis(4-hydroxyphenyl)sulfone polycarbonates.

A further object of this invention is to provide high molecular weight thermoplastic polycarbonates which are soluble in ordinary polycarbonate solvents.

Yet another object of this invention is to provide high molecular weight polycarbonates having high second order transition temperatures and the ability to soften thermoplastically without decomposition.

Still another object of this invention is to provide a polycarbonate having a high second order transition temperature coupled with tensile elongation properties similar to those of the 2,2-bis(hydroxyphenyl)propane polycarbonates.

It is an additional object of this invention to provide high molecular weight linear thermoplastic polycarbonates having high second order transition temperatures coupled with aging stability when tempered in air at elevated temperatures.

The foregoing objects and others which will become apparent from the following description are accomplished in accordance with this invention, generally speaking, by providing a polycarbonate containing the repeating unit:

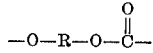

wherein from about 20% to about 100% of the radicals R is a radical having the formula

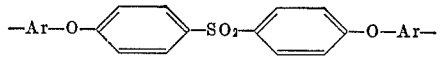

wherein Ar is the same or different, substituted or unsubstituted arylene, arylene ether, diarylene alkane, diarylene and the like groups, the remainder of the radicals R being the same or different, substituted or unsubstituted alkylene, cycloalkylene or Ar radicals. In a preferred polycarbonate, about 50 mol percent of the radicals R are

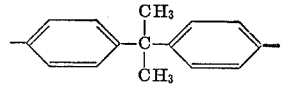

and the remaining about 50 mol percent of the radicals R are

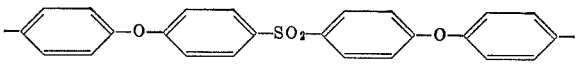

The polycarbonates of this invention are high molecular weight thermoplastic polymers having high second order transition temperatures coupled with advantages properties such as, for example, hydrolytic stability, solubility in ordinary polycarbonate solvents, the ability to soften thermoplastically without decomposing, good retention of physical and mechanical properties such as tensile strength and elongation, good stability to aging, even at elevated temperatures and so on.

Any suitable process may be used in preparing the polycarbonates of this invention with the proviso that from about 20% to about 100% of the organic dihydroxy compound which is reacted with the polycarbonate-forming derivative of carbonic acid under suitable reaction conditions is a compound of the formula

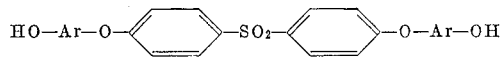

wherein Ar is the same or different, substituted or unsubstituted arylene, arylene ether, diarylene alkane, diarylene and the like groups, the substituents being inert with respect to the reaction mixture and reaction product, and preferably being alkyl or halogen. When the substituent is halogen, any suitable halogen including chlorine, fluorine, bromine, iodine, and the like may be used. When the substituent is alkyl, any suitable alkyl group having from 1 to about 12 carbon atoms, including methyl, ethyl, propyl, isopropyl, butyl, tertiary butyl, decyl and the like, for example, may be used.

Ar may be any suitable arylene radical such as, for example, phenylene, naphthylene, anthrylene and the like which may be substituted or unsubstituted. Ar may be any suitable arylene ether such as, for example, diphenylene ether, triphenylene ether, tetraphenylene ether, dinaphthylene ether, trinaphthylene ether, dianthrylene ether and the like which may be either substituted or unsubstituted. Ar may be any suitable diarylalkane such as, for example, those diarylalkanes which correspond to the dihydroxydiaryl alkanes listed in the U.S. and Canadian patents set forth hereinafter. Ar may be any suitable diarylene such as, for example, diphenylene, dinaphthylene, dianthrylene and the like which may be either substituted or unsubstituted.

Hence, any suitable sulfonyl bisphenol compound having the foregoing formula may be used in the practice of this invention. Some such suitable sulfonyl bisphenols which may be used include, for example, 4,4'-bis[(4-hydroxy)phenoxy]phenyl-sulphone, 4,4' - bis[4-(4-hydroxyphenyl)phenoxy]phenyl-sulphone, 4,4' - bis[4-(4-hydroxyphenoxy)phenoxy]phenyl-sulphone and 4,4'-bis-[4 - (4 - hydroxyphenylisopropylidenyl)phenoxy]phenyl-sulphone, 4,4' - bis[(4-hydroxy) - (3-methyl)phenoxy] phenyl-sulphone, 4,4' - bis[(4-hydroxy) - (3-tert.butyl) phenoxy]phenyl-sulphone, 4,4' - bis[(4-hydroxy) - (3-chloro)-phenoxy]phenyl-sulphone, 4,4'-bis[4-(4-hydroxy-3 - methyl-phenyl-isopropyl)phenoxy]phenyl-sulphone, 4,4'-bis[4-(4-hydroxy - 3,5 - dichloro-phenyl-isopropyl)-phenoxy]phenyl-sulphone and mixtures thereof and the like.

The sulfonyl bisphenols of the foregoing formula may be prepared by any suitable method, but preferably, by reacting 1 mol of a 4,4'-dihalodiphenyl sulfone with about 2 mols of a dialkli metal phenolate in the presence of strongly polar inert organic solvents at temperatures between about 100° C. and about 160° C. and acidifying the reaction product. Such a process is described, for example, in our copending application Ser. No. 620,233, filed Mar. 3, 1967.

In the preparation of the polycarbonates of this invention, other bisphenols and active hydrogen containing compounds may be used in addition to the sulfonyl bisphenols of the foregoing formula, to prepare copolymeric polycarbonate products. For example, substituted or unsubstituted bis(hydroxaryl)alkanes, -cycloalkanes, -ethers, -sulfides, -sulfoxides, -sulfones and the like as well as hydroquinone, resorcinol, dihydroxydiphenyl, dihydroxynaphthalene and the like may also be used. Compounds of this type may contain any suitable substituent which is inert with respect to the reactants and reaction product, but preferably alkyl or halogen. When the substituent is halogen, any suitable halogen including chlorine, fluorine, bromine, iodine and the like may be used. When the substituent is alkyl, any suitable alkyl group having from about one to about 12 carbon atoms including methyl, ethyl, propyl, isopropyl, butyl, tertiary butyl, decyl and the like, for example, may be used.

Some specific examples of suitable bisphenols which may be used with the sulfonyl bisphenols of the foregoing formula to prepare copolycarbonates and contribute the remainder of the radicals R, if any, in the generic formula set forth herein include bis(4-hydroxyphenyl)methane, 1,1-bis(4-hydroxy-phenyl)ethane, 2,2-bis(4-hydroxyphenyl)propane, 2,2-bis(4-hydroxy-3-methyl-phenyl)propane, 2,2-bis(4-hydroxy-3,5-dichloro-phenyl)propane, bis-(4-hydroxy-3,5-dimethyl-phenyl)methane, bis(4-hydroxyphenyl)ether, bis(4-hydroxy-phenyl)sulphide, bis(4-hydroxy-phenyl)sulphoxide, bis(4 - hydroxy-phenyl)sulphone, 1,1-bis(4-hydroxy-phenyl)cyclohexane and the like as well as those described in Canadian Patents, 578,585, 578,975, 594,805 and U.S. Patents 2,999,846, 3,028,365, 2,999,835, 3,153,008, 3,215,668, 3,187,065, 2,970,031, 2,964,794, 2,991,273, 3,014,891 and the like.

Copolymeric polycarbonates may also be prepared from aliphatic dihydroxy compounds, which may be either substituted or unsubstituted as described for the bisphenols and the sulfonyl bisphenols described herein. Some such suitable aliphatic dihydroxy compounds include, for example, butane-1,4-diol, hexane-1,6-diol, neopentyl glycol, 1,4-bis(hydroxymethyl)cyclohexane, cyclohexane-1,4-diol and the like as well as those described in U.S. and Canadian patents listed in the foregoing paragraph. Further, mixtures of the aliphatic dihydroxy compounds and the bisphenols may be used in conjunction with the sulfonyl bisphenols described herein to prepare copolymeric polycarbonates.

Any of the known processes for preparing polycarbonates may be used to prepare the polycarbonate of this invention with the proviso that from about 20% to about 100% of the organic dihydroxy compound which is reacted with the polycarbonate-forming derivative of carbonic acid under suitable reaction conditions is the sulfonyl bisphenol described herein. Thus, the interfacial polycondensation method of preparation may be used wherein the bisphenols and, where desired, chain terminating compounds such as phenol, p-tertiary butylphenol and the like, are dissolved or suspended in an alkaline-aqueous phase which is in intimate contact with a water-immiscible, organic solvent phase. Phosgene or the bis-chloroformates of the bisphenols are dissolved in the organic solvent phase. In this process it is expedient to use a catalyst such as, for example, tertiary amines, quaternary ammonium, sulphonium or phosphonium salts and the like. While the polycondensation reaction progresses at the water/solvent interface, the polycarbonate dissolves in the organic solvent and the alkali of the aqueous phase acts as an exceptor for the acid by-products of the reaction.

Alternatively, the preparation of the polycarbonates of this invention can also be effected in an anhydrous homogeneous medium by introducing phosgene into a solution of the bisphenols in some suitable solvent such as, for example, pyridine, possibly in admixture with methylene chloride.

Another process for the production of the polycarbonates of this invention comprises heating the bisphenols together with suitable diesters of carbonic acid to temperatures of from about 200° C. to 350° C., advantageously in the presence of acidic or basic transesterification catalysts and under reduced pressure. The volatile components which evolve under the reaction conditions are continuously distilled off. Further, those processes including reaction conditions and reaction components as described in the U.S. and Canadian patents listed herein may also be used advantageously to prepare the polycarbonates of this invention, as well as those referred to in "Polycarbonates" by William F. Christopher and Daniel W. Fox.

The polycarbonates of this invention are eminently suitable in any application for which thermoplastics are suitable, particularly in view of their high second order transiton temperatures and their thermostability and retention of physical and mechanical properties. Thus, the polycarbonates of this invention are suitable for the production of film, wall paneling, windows, golf balls, skis, helmets and so on.

The invention is further illustrated but is not intended to be limited by the following examples in which all parts and percentages are by weight unless otherwise specified.

A typical method for the preparation of a sulfone bisphenol to be used in preparing the polymer of this invention is as follows:

Production of 4,4'-bis(4-hydroxy)phenoxy-phenylsulphone

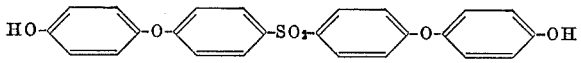

About 11 parts (0.1 mol) of hydroquinone are placed in a glass flask of 250 ml. capacity and dissolved in about 50 ml. of dimethyl sulphoxide (DMSO). The glass flask is fitted with a gas feed tube, a stirrer, a thermometer, a reflux condenser and a water receiver filled with benzene, and a slow nitrogen current is passed through the apparatus in order to create an inert gas atmosphere. About 11 parts (0.2 mol) of potassium hydroxide in the form of tablets and about 20 ml. of benzene are added. The reaction mixture is then heated at a temperature of about 140° C for about 4–5 hours, while the water resulting from the salt formation is continuously distilled off azeotropically with benzene. When the water is substantially removed from the mixture, the latter is allowed to cool. About 14 parts (0.05 mol) of 4,4'-dichlorodiphenylsulphone disolved in about 50 ml. of dimethyl sulphoxide are then added. The mixture is heated with rapid stirring at about 130°–140° C. for about 2–3 hours, whereby the potassium chloride formed in the reaction rapidly separates. After cooling, the mixture is slowly poured into about 300 ml. of water which has been acidified with sulphuric acid and caused to move rapidly by means of a stirrer. The reaction product is thereby precipitated in solid form. It is filtered off with suction and then dissolved in about a 5% aqueous sodium hydroxide solution in order to remove any unreacted 4,4'-dichloro-di-phenyl-sulphone. The solution is filtered and subsequently poured with rapid stirring into about 5% sulphuric acid, whereby the dihydroxyaryl ether is precipitated in the form of a white powder. The powder is washed with hot water in order to remove any unreacted hydroquinone. If the powder is colored, it can easily be decolored by means of active charcoal after being dissolved in ethanol or dioxane.

Yield 93% of theory, percent by weight phenol·OH calc. 7.85. M.P. 187–188° C. Found: 7.9.

EXAMPLE 1

A clear solution is prepared in a reaction vessel provided with a stirrer, dropping funnel, gas inlet and outlet tube and a nitrogen atmosphere from about 2170 parts of 4,4'-bis[(4-hydroxy)phenoxy]phenylsulphone, about 16.2 parts of p-tert.-butylphenol, about 6000 parts of distilled water and about 932 parts of a 45% sodium hydroxide solution. About 22,000 parts of methylene chloride are added to the clear solution. About 608 parts of phosgene are introduced into the reaction mixture from a gas cylinder at a temperature of about 24° C. to 26° C. within 60 minutes and from about the 5th to about the 50th minute, about 433 parts of a 45% sodium hydroxide solution are added dropwise to the reaction mixture simultaneously with the phosgene After the introduction of phosgene is completed, about 6 parts of triethylamine are added and the mixture is then stirred for another hour. The mixture is permitted to settle, the mehylene chloride phase is separated and washed several times consecutively with a 2% sodium hydroxide solution, a 2% hydrochloric acid solution and finally with distilled water until the pH is neutral. A polycarbonate film is cast from this solution, after appropriately increasing its concentration. The film is dried at about 40° C. for about 24 hours and at about 100° C. for about 48 hours in a vacuum drying cabinet. The relative viscosity of the polycarbonate obtained is about 1.38 (c.=0.5 g./100 ml. methylene chloride at 25° C.).

EXAMPLE 2

A solution is prepared from about 65 parts of 4,4'-bis [(4-hydroxy)phenoxy]phenyl-sulphone, about 34 parts of 2,2-bis(4-hydroxyphenyl)propane, about 56 parts of a 45% sodium hydroxide solution, about 1 part of p-tert.-butylphenol, about 350 parts of distilled water and about 500 parts of methylenechloride as described in Example 1. About 37 parts of phosgene are introduced to the reaction mixture over about 50 minutes while, from about the 5th to about the 45th minute, about 26 parts of about a 45% sodium hydroxide solution are added dropwise to the reaction mixture simultaneously with the phosgene. After the introduction of the phosgene is completed, about 3 parts of about a 4% aqueous triethylamine solution are added. The reaction mixture is then stirred for about another 60 minutes. The methylene chloride phase is separated, washed and processed as described in Example 1 to yield a cast film. The relative viscosity of the mixed polycarbonate obtained is about 1.31 (c.=0.5 g./100 ml. methylene chloride at 25° C.).

EXAMPLE 3

About 2 parts of phosgene are introduced at about 25° C. to 27° C. within about 10 minutes into the reaction mixture of about 10 parts of 4,4'-bis[4-(4-hydroxyphenyl) phenoxy]phenylsulphone, about 3 parts of a 45% sodium hydroxide solution, about 40 parts of distilled water and about 100 parts of methylene chloride as described in Example 1. About 1 part of about a 4% aqueous triethylamine solution is then added and the mixture is stirred for about 30 minutes more. The methylene chloride phase is separated, washed and processed as described in Example 1 to yield a cast film. The relative viscosity of the copolycarbonate obtained is about 1.47 (c.=0.5 g./100 ml. methylene chloride at 25° C.).

EXAMPLE 4

About 4 parts of phosgene are introduced within about 20 minutes (at about 24° C. to 26° C.) into the reaction mixture of about 20 parts of 4,4'-bis[4-(4-hydroxyphenyl-isopropyl)phenoxy]phenyl-sulphone, about 8 parts of about a 45% sodium hydroxide solution, about 150 parts of distilled water, about 150 parts of methylene chloride and about 0.04 part of p-tert.-butylphenol as described in Example 1. About 1.5 ml. of about a 4% aqueous triethylamine solution are then added and the mixture is stirred for about another 60 minutes. The methylene chloride phase is separated, washed and processed as described in Example 1 to yield a cast film. The relative viscosity of the polycarbonate is about 1.31 (c.=0.5 g./100 ml. methylene chloride at 25° C.).

Second order transition temperature determinations

To determine the second order transition temperature, shear modulus measurements are carried out which are dependent upon the temperature. The $T_{max}$ is the temperature at which the shear modulus spasmodically decreases (twisting vibration method, measured on 80μ thick cast film):

Polycarbonate $T_{max}$, °C.

Polycarbonate prepared from 4,4'-bis[(4-hydroxy)phenoxy]phenyl-sulphone and described in Example 1 _____ 205

Polycarbonate prepared from 4,4'-bis[4-(4-hydroxyphenyl)phenoxy]phenyl-sulphone and described in Example 3 _____ 220

Polycarbonate prepared from 4,4'-bis[4-(4-hydroxyphenyl-isopropyl)phenoxy]phenyl - sulphone and described in Example 4 _____ 185

Copolycarbonate prepared from 50 mol percent 4,4'-bis[(4-hydroxy)phenoxy]phenyl-sulphone and 50 mol percent 2,2-bis(4-hydroxy - phenyl)propane and described in Example 2 _____ 165

Hydrolysis stability determinations

The hydrolysis stability of the polycarbonate films in dilute ammonia (20 parts by volume of concentrated ammonia, 80 parts by volume of water), at a temperature of 22° C. is determined and expressed as relative periods of time until destruction of the films:

Polycarbonate Relative time

Polycarbonate prepared from bis(4-hydroxy-phenyl)sulphone _____ 1

Copolycarbonate prepared from 50 mol percent bis 4-hydroxy-phenyl)sulpone and 50 mol percent 2,2-bis(4-hydroxyphenyl)propane _____ 1

Polycarbonate prepared from 4,4'-bis[(4-hydroxy)phenoxy]phenyl-sulphone and described in Example 1 _____ 12

Polycarbonate prepared from 4,4'-bis[4-(4-hydroxyphenyl)phenoxy]phenyl-sulphone and described in Example 3 _____ 15

Copolycarbonate prepared from 50 mol percent 2,2-bis(4-hydroxy-phenyl)propane and 4,4'-bis[4-(4-hydroxyphenyl-isopropyl)phenoxy]phenyl-sulphone _ 14

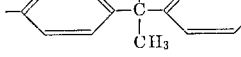

Thermal aging in the air

The polycarbonate prepared from 4,4'-bis[(4-hydroxy)phenoxy]phenyl-sulphone and described in Example 1 is tempered in the form of a cast film at about 190° C. for about 4 weeks in an aerated drying cabinet. No subsequent darkening is observed and the tempered film is completely soluble in methylene chloride. The geometrical measurements of the tempered film remain unchanged.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A polycarbonate having a high second order transition temperature coupled with hydrolytic stability, good solubility in organic solvents, good aging stability and thermoplasticity consisting essentially of repeating units of the formula

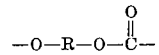

wherein from about 20% to 100% of the radicals R have the formula

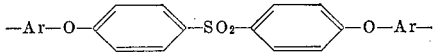

wherein Ar is arylene, arylene ether, diarylene alkane or dairylene, the remainder of the radicals R being alkylene, cycloalkylene or Ar.

2. The polycarbonate of claim 1 wherein Ar is

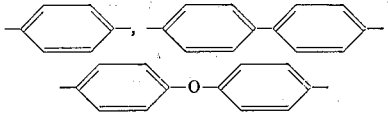

3. The polycarbonate of claim 1 wherein R is

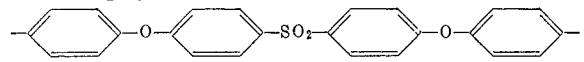

4. The polycarbonate of claim 1 wherein R is

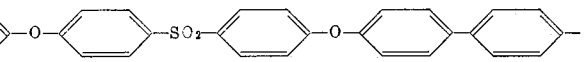

5. The polycarbonate of claim 1 wherein R is

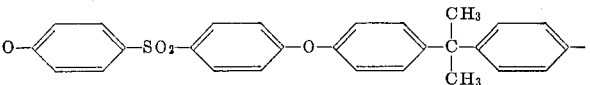

6. The polycarbonate of claim 1 wherein about 50 mol percent of the radicals R are

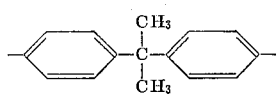

and the remaining about 50 mol percent of the radicals R are

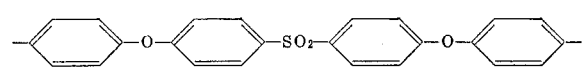

7. The polycarbonate of claim 1 wherein R is

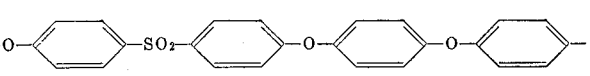

8. The polycarbonate of claim 1 wherein R and Ar are the same or different radicals substituted with a member selected from the group consisting of halogen and alkyl groups having from 1 to 12 carbon atoms.

References Cited

UNITED STATES PATENTS

| | | | |
|---|---|---|---|
| 2,964,797 | 12/1960 | Peilstocker et al. | 18—57 |
| 2,999,846 | 9/1961 | Schnell et al. | 260—49 |
| 3,269,986 | 8/1966 | Goldberg | 260—49 |
| 3,271,364 | 9/1966 | Conix et al. | 260—47 |
| 3,271,367 | 9/1966 | Schnell et al. | 260—49 |

WILLIAM H. SHORT, Primary Examiner.

M. GOLDSTEIN, Assistant Examiner.

U.S. Cl. X.R.

260—47, 33.8